United States Patent
Defendini et al.

(10) Patent No.: US 6,745,984 B2
(45) Date of Patent: Jun. 8, 2004

(54) METHOD OF CONTROLLING THE ATTITUDE AND STABILIZATION OF A SATELLITE IN LOW ORBIT

(75) Inventors: Ange Defendini, Toulouse Cedex (FR); Kristen Lagadec, Toulouse Cedex (FR)

(73) Assignee: Astrium Sas, Velizy Villacoublay (FR)

( * ) Notice: Subject to any disclaimer, the term of this patent is extended or adjusted under 35 U.S.C. 154(b) by 0 days.

(21) Appl. No.: 10/127,700

(22) Filed: Apr. 23, 2002

(65) Prior Publication Data
US 2003/0197096 A1 Oct. 23, 2003

(51) Int. Cl.[7] .................................................. B64G 1/32
(52) U.S. Cl. ........................................ 244/166; 244/171
(58) Field of Search .............................. 244/171, 166, 244/164; 247/171, 166

(56) References Cited

U.S. PATENT DOCUMENTS

| | | | | |
|---|---|---|---|---|
| 3,061,239 A | * | 10/1962 | Rusk | 244/166 |
| 4,927,101 A | | 5/1990 | Blancke | |
| 5,788,188 A | * | 8/1998 | Damilano | 244/165 |
| 6,371,413 B1 | * | 4/2002 | Duchon | 244/164 |

FOREIGN PATENT DOCUMENTS

| FR | 2 630 398 | 10/1989 |
|---|---|---|
| FR | 2742243 | 6/1997 |

OTHER PUBLICATIONS

Luiz Danilo Damasceno Ferreira et al: "Attitude and Spin Rate Control of a Spinning Satellite Using Geomagnetic Field"; Journal of Guidance and Control and Dynamics, US, AIAA, New York, vol. 14, No. 1, 1991, pp. 216–218, XP000257745; ISSN: 0731–5090; the entire document.

* cited by examiner

Primary Examiner—Peter M. Poon
Assistant Examiner—Timothy D. Collins
(74) Attorney, Agent, or Firm—Stites & Harbison, PLLC; Ross F. Hunt, Jr.

(57) ABSTRACT

For controlling the attitude of a satellite placed on a low earth orbit, components of a vector Bm of the earth's magnetic field along three measurement axes of a frame of reference bound with the satellite (typically by means of a three-axis magnetometer) are measured. The orientation of the earth's magnetic field in the frame of reference is computed and a derivative $\dot{B}m$ of the vector is also computed. Magneto-couplers carried by the satellite are energized to create a torque for spinning the satellite at an angular frequency $\omega_c$ about a determined spin axis of the satellite, where $\omega_c$ is greater than an orbital angular frequency $2\omega_0$ of the satellite.

18 Claims, 3 Drawing Sheets

METHOD OF CONTROLLING THE ATTITUDE AND STABILIZATION OF A SATELLITE IN LOW ORBIT

BACKGROUND OF THE INVENTION

The present invention relates to methods of controlling the attitude of a satellite placed in an orbit that is low enough for the intensity of the earth's magnetic field to enable attitude to be measured by means of a three-axis magnetometer and to enable attitude to be changed by causing magneto-couplers carried by the satellite to interact with the earth's magnetic field.

In practice, this condition is satisfied when at least part of the satellite's orbit is at an altitude of less than 2000 kilometers (km).

An attitude control method is already known (FR-A-2 742 243 or U.S. Pat. No. 5,788,188) making it possible to reduce the speed of rotation of a satellite, in particular on being released from its launcher, and to orient an axis bound with the satellite so that it is normal to the plane of the orbit. In that method, using a so-called "B dot" relationship because it makes use of the derivative of the earth's magnetic field B, the earth's magnetic field is measured along three axes of a frame of reference associated with the satellite, the measurements are differentiated with respect to time, the derivatives are multiplied by a gain, and a current representative of the result is passed through magneto-couplers to create magnetic moments tending to keep the satellite stationary relative to the lines of force of the earth's magnetic field.

Such a method has already been used for controlling the attitude of a satellite carrying flywheels or momentum wheels for creating an internal angular momentum that provides gyroscopic stiffness. However, in some missions, it is desirable to avoid using inertial actuators (flywheels or momentum wheels). By way of example, mention can be made of satellites that are to perform high-precision scientific missions and that have as little on-board mechanism as possible, or satellites for earth observation missions using gyroscopic actuators that are preferably used in normal mode only.

A principle is as follows: a torque is applied to the satellite by means of magneto-couplers to oppose variation in the magnetic field measured along axes bound to the satellite, making use of the fact that the geomagnetic field is locally uniform and any variation in the components of the magnetic field as measured along the axes bound to the satellite constitutes a good approximation to the angular velocities of the satellite. The magneto-couplers are controlled so that they apply torques opposing the measured angular velocities, in order to reduce the speeds of rotation.

Conventionally, the magneto-couplers are controlled for this purpose in such a manner as to create a magnetic moment vector Mc proportional to the derivative with respect to time of the measured terrestrial magnetic field value Bm:

$$Mc=-k.\dot{B}m \quad (1)$$

In this formula, k designates a gain.

The stabilization caused by this kind of control, which dissipates energy, causes the satellite to turn or spin at a speed $2\omega_0$ which is equal to twice its orbital angular frequency about the normal to the orbit.

Spinning at two turns per orbit, even about an axis of greatest angular inertia, possibly does not provide sufficient gyroscopic stiffness to stabilize the satellite.

In addition, it can be preferable to cause the satellite to spin about an axis other than its axis of greatest inertia, for example about the axis normal to the plane of the solar generators that are usually carried by a satellite.

SUMMARY OF THE INVENTION

An object of the invention is to provide a method of stabilizing a satellite in low orbit without requiring, at least to any significant extent, of an internal angular momentum, and consequently making it possible to avoid using flywheels or momentum wheels.

To this end, there is provided in particular a method in which the components of the earth's magnetic field vector are measured along three measurement axes of a frame of reference bound to the satellite (in practice by means of a three-axis magnetometer); the value and the orientation of the earth's magnetic field as measured in the frame of reference and the derivative $\dot{B}m$ of the field vector are deduced therefrom, and magneto-couplers carried by the satellite are controlled to generate a torque for setting the satellite into rotation at an angular frequency ωc about a predetermined spin axis of the satellite, where ωc is greater than $2\omega_0$.

The required rotation or spinning rate can be obtained by adding, to the term $\dot{B}m$ of formula (1), a reference or set vector $\dot{B}i$ representing an angular velocity or bias giving the desired spinning rate. Formula (2) then gives the torque Mc to be applied by means of the magneto-couplers, and thus the current to be applied thereto.

$$Mc=-k(\dot{B}m-\dot{B}i) \quad (2)$$

The bias $\dot{B}i$ can be calculated, for example from the value of the desired angular velocity vector Ωi:

$$\dot{B}i=\Omega i \times \dot{B}m$$

which means that the moment, Mc, to be applied is $$Mc=kB.(\dot{b}_m-\dot{b}_i)=kB.(\dot{b}_m-\Omega i \times \dot{b}_m) \quad (3)$$

where bi is a variation of the set magnetic direction in the frame of reference of the satellite (b designating normalized vector B), and Ωi is the desired angular velocity vector for said magnetic direction $b_i$ in the satellite frame of reference.

For example, $\Omega i=[0\ 0\ \omega_i]$ if it is desired that the magnetic field turns at velocity ωi about the pitch axis Zs (the axis orthogonal to the plane of the solar generators).

Implementing the relationship (2) causes energy to be dissipated and ensures convergence. It tends to cancel out the angular velocity component of the satellite transverse to its spin axis and thus to damp nutation, and in particular the nutation which can exist during injection onto orbit.

A particular spin relationship (2) spinning rate velocity and direction of the spin axis in the satellite frame of reference) will be selected as a function of various parameters, such as the inclination of the orbit relative to the equator and/or the current phase from amongst successive phases of a mission.

The mission can require the spin axis to be oriented other than normally to the plane of the orbit, whereas relationship (2) brings the selected spin axis into this direction.

For example, it can be desirable to orient the spin axis towards the sun so that the solar generators receive maximum power. To do this, the spin axis will be "righted" or "erected" so as to bring it onto the direction of the sun, which required (i) measuring the orientation of the satellite relative to the sun and (ii) modifying the relationship (2) for reaching nominal conditions.

The orientation of the sun can be determined using a sun sensor whose aiming direction coincides with the desired spin axis (e.g. normal to the solar generators) and which provides an error signal in two directions.

It is not necessary for the sun sensor to have a characteristic that is linear, since all that matters is the direction of the sun.

During eclipses, the solar sensor does not provide any measurement. Nevertheless the direction of the spin axis remains under control as during a daylight phase in application of relationship (2). The continuity of this relationship ensures that the spin axis becomes progressively realigned with the normal.

Once convergence has been obtained by relationship (2), the sun will be in the sensor's field of view, which is generally almost hemispherical, except when the difference between the directions of the sun and the plane of the orbit is very small. Under such circumstances, an additional sensor having an aiming direction different from that of the first and possibly having a narrow field of view is provided.

To sum up, implementing control relationship (2) makes it possible to reach a determined initial state of rotation about a spin axis orthogonal to the plane of the orbit and to damp any nutation of whatever origin. Righting or erecting the spin axis can give rise to new nutation; that will be damped by the same process as during initial stabilization using relationship (2).

It can be seen that the method of the invention does not require any thruster, or any gyroscope, and that the only sensors required are a three-axis magnetometer and possibly a wide angle solar sensor so as to be able to see the sun immediately on leaving eclipse, and at the end of stabilization that brings the spin axis to a direction normal to the orbit plane. Only magneto-couplers are used to control attitude. The control relationships are very simple.

The above characteristics and others will appear more clearly on reading the following description of a particular embodiment, given by way of non-limiting example with reference to the accompanying drawings.

DETAILED DESCRIPTION

Figure 1:
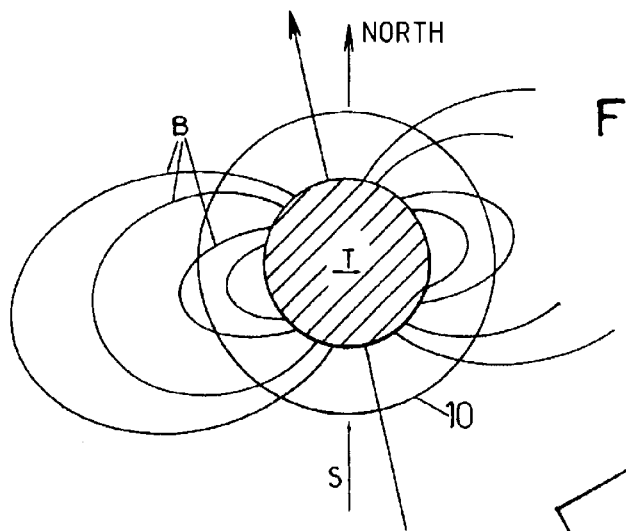
FIG. 1 is a diagram showing the configuration of the lines of the earth's magnetic field through which a satellite traveling in polar orbit passes.

It is recalled that the lines of the magnetic field of the earth T have the general appearance shown by the lines B in FIG. 1 in a plane that contains the poles. The use of a B dot relationship makes it possible to absorb the rotational energy presented by the satellite, after separating from the launcher or in the event of an incident, until the satellite becomes fixed relative to the lines of the earth's magnetic field, which means that the satellite is then rotating at twice the angular frequency $\omega_0$ of its orbit about the normal to the plane of its orbit.

In order to avoid interactions between the magneto-couplers and the magnetometer, it is possible to take the measurements and to drive the magneto-couplers in alternation, for example.

Figure 2:
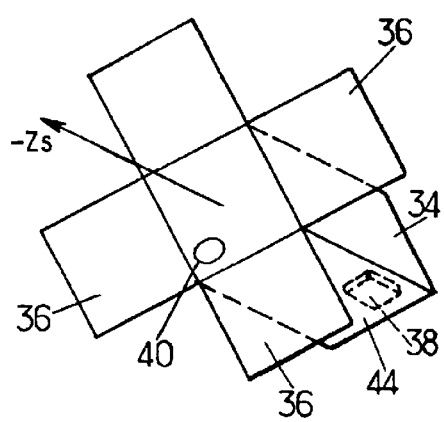
FIG. 2 shows one possible structure for a satellite to which the invention is applicable.

By way of example, the description below relates to a satellite whose general configuration is as shown in FIG. 2. The satellite comprises a casing 34 having solar generators 36 mounted thereon in a fixed orientation. An axis in the plane of the solar generators is written Ys and the axis normal to the plane of the solar generators is written Zs. The casing carries a three-axis magnetometer 38 and magneto-couplers (not shown) enabling moments to be applied to the satellite by interacting with the earth's magnetic field. The satellite also carries a sun sensor 40. It will be assumed that the satellite is to be placed on a low polar orbit that is heliosynchronous and that local time for its ascending node is close to noon-midnight, with the spin axis of the satellite being oriented towards the sun so as to obtain maximum illumination of its solar generators.

The successive steps of a sequence for bringing the satellite into its permanent configuration on orbit are described below.

1. A first step serves to reduce undesired speeds of rotation, to cause the satellite to spin, to bring the spin axis towards the normal to the plane of the orbit, and to damp nutation.

To do this, relationship (2) is implemented as soon as the satellite separates from the launcher (or on leaving a survival mode).

As mentioned above, by dissipating energy, using the relationship reduces the angular velocities due, for example, to angular momentum being transferred on separation.

The bias $\dot{B}i$ introduced into the relationship (2) makes it possible to cause the angular velocities of the satellite to converge quickly on a constant angular velocity about the selected axis (the axis Zs for an appropriate value of $\dot{B}i$).

Establishing spin is performed in parallel as soon as the velocities are reduced.

The angular velocity reached corresponds to the sum $\omega_i + 2\omega_0$, i.e. the sum of the set speed of rotation in satellite axes plus the speed of rotation of the magnetic field lines around the orbit.

Relationship (2) guarantees that the axis will finally be in alignment with the normal to the plane of the orbit without any risk of inverse capture: the stable converged state corresponds to the situation in which the satellite is turning at the highest possible angular velocity ($2\omega_0 + \omega_i$, not $-2\omega_0 + \omega_i$) about its spin axis.

Figure 3:
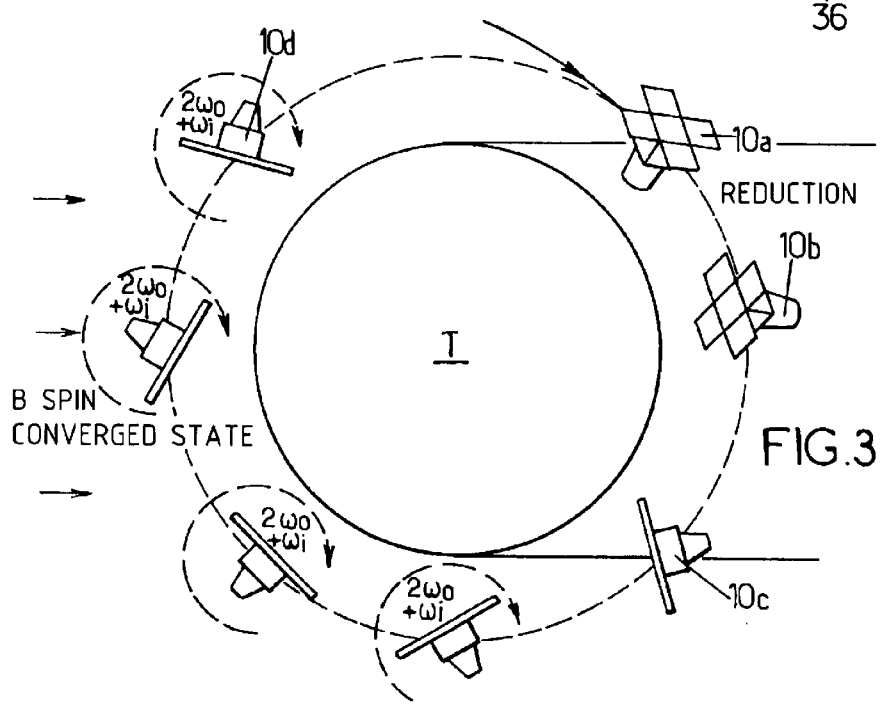
FIG. 3 shows successive orientations of a satellite placed on a polar orbit or on an orbit that is highly inclined relative to the equator, from injection until speeds have been reduced in application of the "B spin" relationship.

The progress of satellite attitude during its first orbit can be as shown in FIG. 3. In general, on injection at 10a, the orientation and the angular velocities (spin and nutation) of the satellite are ill-defined. Application of relationship (2) leads to a reduction in the stray angular velocities, up to state 10b. Progressively, the satellite is caused to turn about a selected spin axis at an angular frequency $2\omega_0$ (positions 10c to 10d)+$\omega$i.

In the final situation, in the daytime phase, the sun describes a circle of 60° angular radius about the aiming axis of the solar sensor 40 for a 10:00 AM or a 2:00 PM orbit. Under such circumstances, a single sensor suffices during the second step. If the angular radius exceeds 80° (as is the case for an orbit for which local time of the node lies in the range 11:20 AM to 12:40 PM) it is no longer certain that the sun will be seen by the sensor whose aiming axis is orthogonal to the plane of the solar generators. An additional sensor then needs to be provided on one face of the body in order to know in which direction to apply the torque for erecting the spin axis.

In the common case where the spin axis is not the axis of maximum angular inertia, the gain k in relationship (2) must be sufficient to ensure that the system remains stable. For this purpose, the control passband must be greater than the unstable pole of the free dynamics. To avoid nutation diverging, possibly as far as "flat" nutation, it will often be necessary to use a high value for k.

2. The second step is constituted by "righting" or "erecting" the spin axis. It is controlled responsive to signals representing the angular difference (in two directions that are generally orthogonal) between the direction to the sun and Zs (normal to the plane of the solar generators).

Figure 4:
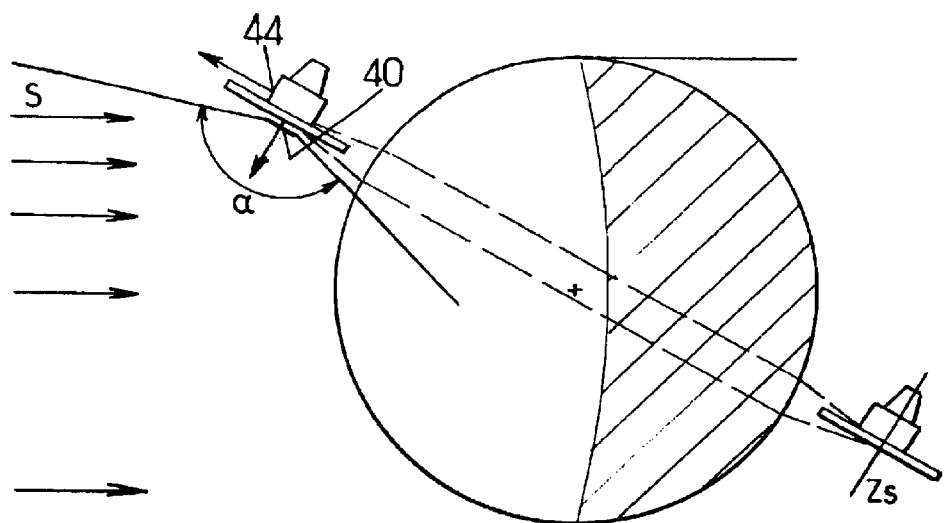
FIG. 4 shows conditions for acquiring the direction of the sun.

FIG. 4 is a diagram showing an acquisition mode that uses a solar sensor 40 having a wide angle α, providing a difference signal relative to the direction S to the sun in two directions so long as the satellite is not in the earth's shadow. A second sensor, on a side face 44, makes it possible to obtain the same kind of signal when the sun leaves this field, for orbits in the range 11:20 AM to 12:40 PM.

To reorient the spin axis, the magneto-couplers are energized to generate a torque perpendicular to the spin axis Zs (so as to avoid disturbing the modulus of the angular momentum vector) and towards the sun. It is only possible to provide torque in the plane normal to the direction of the local magnetic field. Torque is thus generated which lies simultaneously in the plane normal to the magnetic field $\vec{B}$ and normal to $\vec{H}$.

The direction in which action is applied is selected to be that which causes the spin axis to approach the direction of the sun, and the selected amplitude is an increasing function of the difference between the spin axis and the direction of the sun and of the ground (e.g. proportional thereto):

$$C_1 = \kappa (u_{sun} . n_B) n_B \quad (4)$$

where κ is a gain, $u_{sun}$ is the direction of the sun in the axes of the satellite, and $n_B$ is a direction vector of the intersection between the plane normal to B and the plane normal to H, i.e. the plane $(X_{sat}, y_{sat})$ where $y_{sat}$ is along the orbital normal in geocentric pointing.

In all cases, erection takes place progressively for the usual values of spin rates and inertias, with erecting generally taking place over a single orbit.

The torque used for "righting" or "erecting" the spin axis tends to excite nutation. Relationship (2) ensures that nutation is damped, both in the daylight stage and during an eclipse, with damping being better during eclipse since there is then no excitation.

3. Instead of waiting until the step of reducing velocities and aligning the spin axis with the normal to the orbit has converged (typically 2 to 3 orbits) before starting use of the relationship for erecting the spin axis, it is possible to apply both relationships in parallel: if the sun is visible in the field of the solar sensor prior to convergence in the "B spin" stage, then axis erecting can already begin. Thus, the total time required for acquisition is often equal to the time required for reducing angular velocities.

The complete sequence thus takes place naturally without any transition logic.

4. It is also possible to trigger the relationship erecting the spin axis at the same time as the step for reducing velocities and aligning the spin axis with the normal to the orbit.

Acquisition and Survival Modes

The proposed mode makes no distinction between acquisition and survival.

Relationship (2) is applicable for bringing the satellite into survival mode and for keeping it there, under all circumstances.

Figure 5:
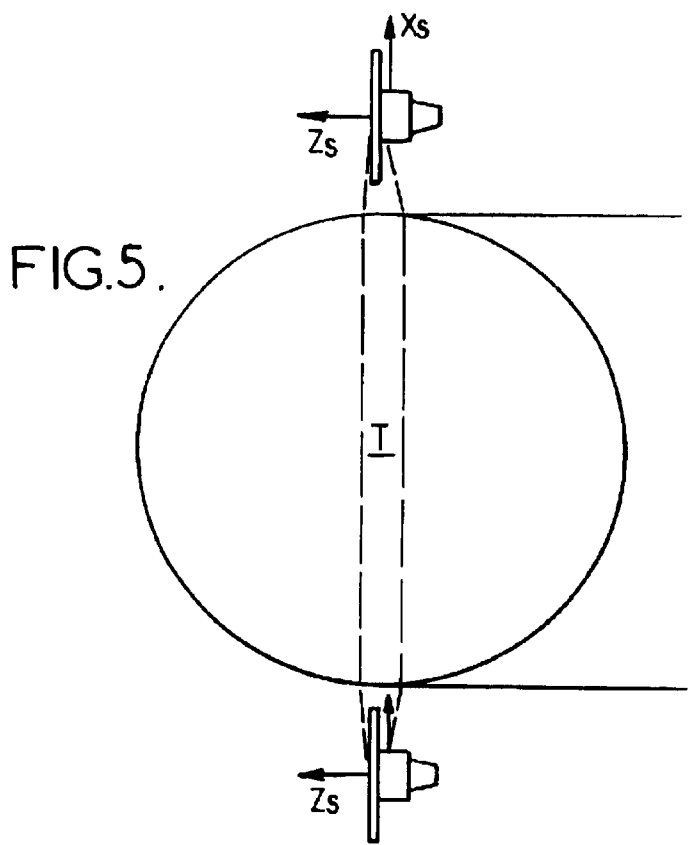
FIG. 5 shows the orientations given by the "B spin" relationship to a satellite placed on a heliosynchronous polar orbit, with its ascending node close to 6:00 AM or 6:00 PM local time.

In the case shown in FIG. 5 of survival on a heliosynchronous polar orbit close to 6:00 AM-6:00 PM, this relationship applied to the axis normal to the solar generators ensures that velocities are reduced, that dynamic behavior converges, that the sun is acquired, and that a stable survival state is achieved without any internal angular momentum vector and without a solar sensor. Adjustment of the desired spin velocity $(2\omega_0 + \omega_z)$ in pitching (about the Zs axis) makes it possible to optimize performance depending on external disturbances.

This survival mode is particularly robust and makes use only of the magnetic sensors and magnetics couples and of a control relationship that is extremely simple, without requiring any logic or any transition threshold. The solar panels are in a "windmill" configuration, i.e. they lie substantially in the plane of the orbit.

For a heliosynchronous polar orbit close to noon-midnight (as shown in FIG. 3) or for equatorial orbits, the spin axis can no longer be aligned towards the sun. The spin axis aligns naturally with the normal to the orbit in application of relationship (2), while the sun is rather in the plane of the orbit. Under such circumstances, the selected spin axis is one of the two axes in the plane of the solar generators. The converged state corresponds to a "barbecue" configuration in which the generators point towards the sun periodically (with a minimum angle of incidence corresponding to the angle between the orbital plane and the direction to the sun).

Nevertheless, if the power budget is unsatisfactory, and if it is desired to have a converged state similar to the "windmill" mode of a 6:00 AM-6:00 PM orbit, relationship (2) on its own is not sufficient and it is necessary to return to the above-mentioned erecting relationship.

Figure 6:
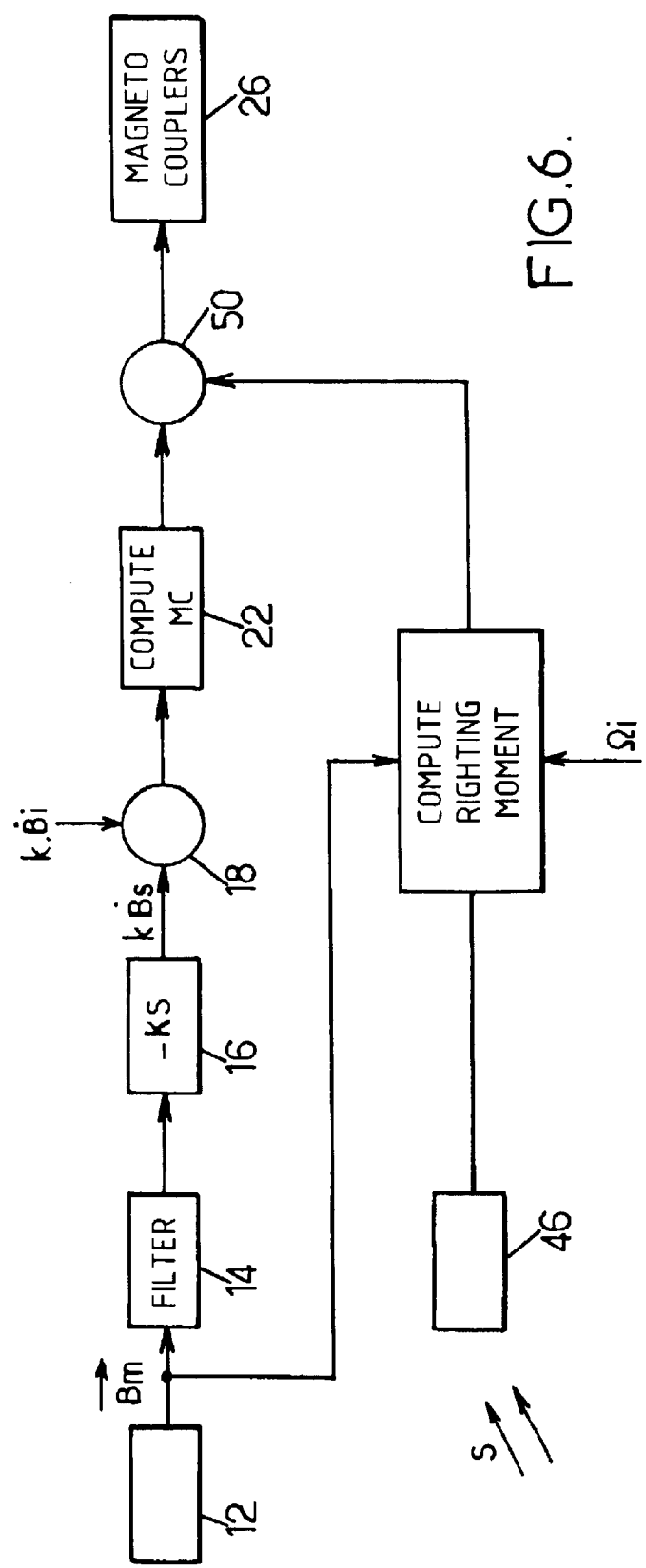
FIG. 6 is a block diagram showing a general structure of apparatus for implementing the modified "B spin" relationship to erect the spin axis.

FIG. 6 shows one possible theoretical structure for a control loop. This loop has a three-axis magnetometer 12 supplying output signals which are filtered at 14 to eliminate interference and transients. A computing unit 16 determines the time derivative of the measurement and multiplies it by a gain k. To obtain equal damping time constants about all three axes, the gain k for each axis is advantageously standardized by the moment of inertia about the axis in question. The term k×$\dot{B}$i is subtracted at 18.

The control torque for application by the magneto-couplers is computed at 22.

The spin-imparting torque is computed using formula (2). It is equal to the vector product of the magnetic moment $\vec{M}$ generated by the magneto-couplers 26 multiplied by the actual magnetic field $\vec{B}$. If the required torque corresponds to current that is so high that the magneto-couplers do not have a linear characteristic, then an additional computation unit can be provided to take account of saturation and limit the current which is applied to the magneto-couplers 26.

We claim:

1. A method of controlling and stabilizing the attitude of a satellite placed on a low earth orbit, comprising the steps of:

measuring components of a vector of the earth's magnetic field along three measurement axes of a frame of reference bound with the satellite, deducting an orientation of said earth's magnetic field in the frame of reference and a derivative $\dot{B}m$ of the vector from said components, and controlling magneto-couplers carried by the satellite based on said orientation and said derivative and exclusive of any additional attitude measurements, so as to create a torque from said orientation and derivative of earth's magnetic field for setting the satellite into rotation at an angular frequency $\omega_c$ about a selected spin axis of the satellite, without need of any internal momentum where $\omega_c$ is greater than $2\omega_0$, $\omega_0$ being an orbital angular frequency of the satellite.

2. A method according to claim 1, wherein said components are measured using a 3-axes magnetometer.

3. A method according to claim 1, further comprising a step of acquisition with exclusive use of measurement of the earth magnetic field, energization of said magneto-couplers and measurement by at least one solar sensor.

4. A method according to claim 1, wherein said magneto-couplers are controlled for applying a magnetic torque to the satellite which is $M_c=-k(\dot{B}_m-\dot{B}_i)$, where:

k is a gain, $B_m$ is a vector representing the local earth's magnetic field, $B_i$ a set vector which represents a bias angular velocity biasing said spin axis to a direction orthogonal to a plane of the orbit.

5. A method according to claim 4, wherein the bias angular velocity represented by said vector $B_i$ is obtained by causing the magneto-couplers to apply a moment $$M_c=kB.(\dot{b}_m-\dot{b}_i)=kB.(\dot{b}_m-\Omega_i\times\dot{b}_m)$$

where B is a standardized scalar representing the earth's magnetic field mean value, $\dot{b}_m$, is of the unit vector aligned with $\dot{B}_m$ with the same direction $\dot{b}_i$ is the unit vector aligned with $\dot{B}_i$ with the same direction and $\Omega_i$ is the desired angular velocity vector in a reference frame bound to the satellite.

6. A method according to claim 4, wherein the bias angular velocity is generated by a moment which is in a plane orthogonal to the earth's magnetic field $\dot{B}_m$.

7. A method according to claim 4, comprising the step of adding, in the law determining the magnetic moment Mc, a term generating a torque component biasing the spin axis to a predetermined direction with respect to a direction toward the sun.

8. A method according to claim 1, wherein a torque orthogonal to the spin axis is generated with the magneto-couplers for forcing the spin axis away from a direction orthogonal to the plane of the orbit, during or after said setting the satellite into rotation.

9. A method according to claim 7, wherein the direction of the spin axis is controlled to be maintained orthogonal to solar generators of the satellite and toward the sun.

10. A method of controlling the attitude of a satellite placed into a low earth orbit with an orbital angular frequency of $\omega_o$, said method comprising the steps of:

measuring components of a vector of the earth's magnetic field along three measurements axes of a frame of reference with respect to the satellite;

determining from said components (i) an orientation of said earth's magnetic field in the frame of reference and (ii) a derivative $\dot{B}_m$ of the vector, and controlling magneto-couplers carried by the satellite, based on said orientation and said derivative and exclusive of any additional attitude measurements, so as to create a torque setting the satellite into rotation at an angular frequency $\omega_c$ about a selected spin axis of the satellite, without need of any internal momentum, wherein said selected axis can be other than the axis of greatest inertia and wherein $\omega_c$ is greater than $2\omega_0$.

11. A method according to claim 10, wherein said components are measured using a 3-axes magnetometer.

12. A method according to claim 10, wherein the method employs an acquisition step solely relying on measurement of the earth's magnetic field, energization of said magneto-couplers and measurement by at least one solar sensor.

13. A method according to claim 10, wherein said magneto-couplers are controlled so as to apply a magnetic torque, Mc, to the satellite represented by the equation $M_c=-k(\dot{B}_m-\dot{B}_i)$ where:

k is a gain, $B_m$ is a vector representing the local earth's magnetic field, and $B_i$ is a set vector representing a bias angular velocity biasing said spin axis into a direction orthogonal to a plane of the orbit of the satellite.

14. A method according to claim 13, wherein the bias angular velocity represented by said vector $B_i$ is obtained by causing the magneto-couplers to apply a moment according to the equation $$M_c=kB.(\dot{b}_m-\dot{b}_i)=kB.(\dot{b}_m-\Omega_i\times\dot{b}_m)$$

where B is a standardized scalar representing the earth's magnetic field mean value, $\dot{b}_m$ is the unit vector aligned with $\dot{B}_m$ in the same direction, $\dot{b}_i$ is the unit vector aligned with $\dot{B}_i$, in the same direction and $\Omega_i$, is the desired angular velocity vector in a reference frame bound to the satellite.

15. A method according to claim 13, wherein the bias angular velocity is generated by a moment in a plane orthogonal to the earth's magnetic field $\dot{B}_m$.

16. A method according to claim 13, further comprising the step of adding, to the equations determining the magnetic moment Mc, a term representing a torque component biasing the spin axis into a predetermined direction with respect to a direction toward the sun.

17. A method according to claim 1, wherein a torque orthogonal to the spin axis is generated with the magneto-couplers so as to force the spin axis away from a direction orthogonal to the plane of the orbit, during or after said setting of the satellite into rotation.

18. A method according to claim 7, wherein the direction of the spin axis is controlled so as to be maintained (i) orthogonal to solar generators of the satellite and (ii) toward the Sun.

* * * * *